(12) United States Patent
Dai et al.

(10) Patent No.: US 10,044,406 B1
(45) Date of Patent: *Aug. 7, 2018

(54) INTERFERENCE MITIGATION IN SINGLE TWISTED-PAIR COMMUNICATIONS

(71) Applicant: Marvell International LTD., Hamilton (BM)

(72) Inventors: Shaoan Dai, San Jose, CA (US);
Kok-Wui Cheong, Los Altos, CA (US);
Zhenzhong Gu, San Jose, CA (US);
Junqing Sun, Fremont, CA (US);
Meng Zeng, Saratoga, CA (US); Xing Wu, Palo Alto, CA (US)

(73) Assignee: MARVELL INTERNATIONAL LTD., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 15/825,937

(22) Filed: Nov. 29, 2017

Related U.S. Application Data

(63) Continuation of application No. 15/164,364, filed on May 25, 2016, now Pat. No. 9,838,072.

(Continued)

(51) Int. Cl.
*H04B 3/04* (2006.01)
*H04B 3/23* (2006.01)
(Continued)

(52) U.S. Cl.
CPC .................. *H04B 3/04* (2013.01); *H04B 3/23* (2013.01); *H04B 17/336* (2015.01); *H04L 25/03885* (2013.01); *H04L 25/085* (2013.01)

(58) Field of Classification Search
CPC .......... H04B 3/04; H04B 3/23; H04B 17/336; H04L 25/03885; H04L 25/085
See application file for complete search history.

(56) References Cited

U.S. PATENT DOCUMENTS

| 5,568,456 A | 10/1996 | Hayashi et al. |
| 6,426,813 B1 | 7/2002 | Swenson et al. |

(Continued)

OTHER PUBLICATIONS

IEEE P802.3bp/D3.0 "Draft Standard for Ethernet Amendment: Physical Layer Specification and Management Parameters for 1 Gb/s Operation over a Single Twisted Pair Copper Cable;" LAN/MAN Standards Committee of the IEEE Computer Society; Dec. 15, 2015; 224 Pages.

(Continued)

*Primary Examiner* — David B. Lugo

(57) ABSTRACT

A transceiver to communicate in a vehicle via a single twisted-pair Ethernet cable includes a transmitter and a receiver, an analog front end, an equalizer, and a controller. The transmitter transmits signals via the single twisted-pair Ethernet cable. The receiver receives signals via the single twisted-pair Ethernet cable. The analog front end receives a first signal received by the transceiver via the single twisted-pair Ethernet cable and outputs a second signal. The equalizer includes a notch filter to cancel electromagnetic interference from the second signal. The controller makes a frequency response of the equalizer independent of the electromagnetic interference by controlling tap values of the notch filter. The controller controls gain of one or more of the analog front end and the equalizer based on the frequency response of the equalizer.

18 Claims, 7 Drawing Sheets

Related U.S. Application Data

(60) Provisional application No. 62/183,845, filed on Jun. 24, 2015.

(51) Int. Cl.
*H04B 17/336* (2015.01)
*H04L 25/03* (2006.01)
*H04L 25/08* (2006.01)

(56) References Cited

U.S. PATENT DOCUMENTS

| | | | |
|---|---|---|---|
| 7,542,528 | B1 | 6/2009 | Cheong |
| 8,315,301 | B1 | 11/2012 | He |
| 8,331,508 | B2 | 12/2012 | Dabiri |
| 8,792,597 | B2 | 7/2014 | Malkin et al. |
| 9,838,072 | B1 * | 12/2017 | Dai .................. H04B 3/04 |
| 2003/0109225 | A1 | 6/2003 | Aldajani et al. |
| 2004/0223544 | A1 | 11/2004 | Upton |
| 2006/0098766 | A1 | 5/2006 | Pietraski et al. |
| 2006/0182014 | A1 | 8/2006 | Lusky et al. |
| 2007/0237270 | A1 | 10/2007 | Mezer et al. |
| 2009/0245448 | A1 | 10/2009 | Ran et al. |
| 2009/0268802 | A1 | 10/2009 | Wang |
| 2011/0085591 | A1 | 4/2011 | Song et al. |
| 2011/0103459 | A1 | 5/2011 | Esmailian et al. |
| 2011/0249184 | A1 | 10/2011 | Elsherif et al. |
| 2013/0241753 | A1 | 9/2013 | Nozaki |
| 2015/0326348 | A1 | 11/2015 | Shen et al. |

OTHER PUBLICATIONS

IEEE P802.3bw/D3.3 "Draft Standard for Ethernet Amendment: Physical Layer Specifications and Management Parameters for 100 Mb/s Operation over a Single Balanced Twisted Pair Cable (100BASE-T1);" LAN/MAN Standards Committee of the IEEE Computer Society; Aug. 21, 2015; 91 Pages.
U.S. Appl. No. 15/164,364, filed May 25, 2016.

* cited by examiner

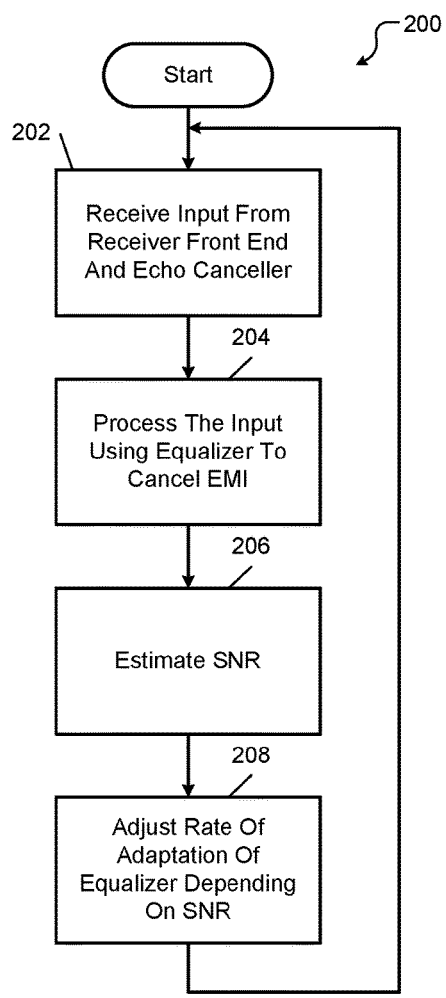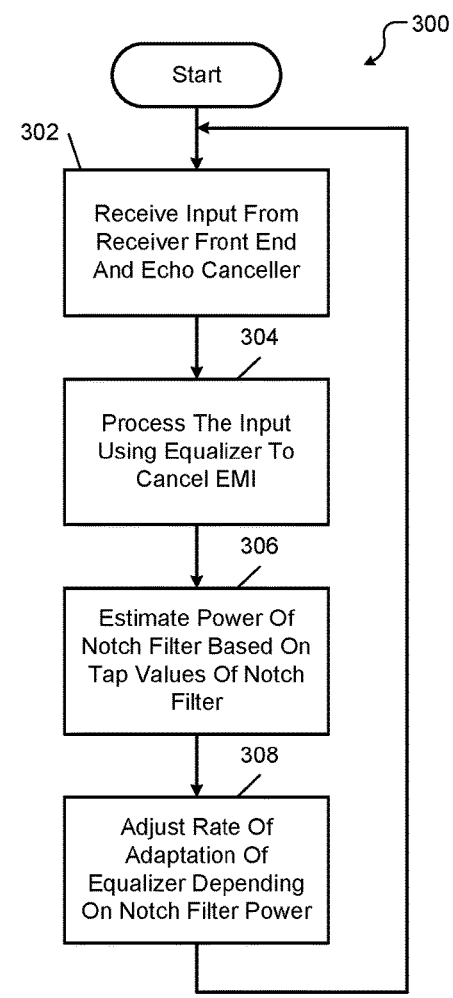
FIG. 5
FIG. 6 ial Application No. 62/183,845, filed on Jun. 24, 2015.
INTERFERENCE MITIGATION IN SINGLE TWISTED-PAIR COMMUNICATIONS

CROSS-REFERENCE TO RELATED APPLICATIONS

This application is a continuation of U.S. patent application Ser. No. 15/164,364 (now U.S. Pat. No. 9,838,072), filed May 25, 2016 which claims the benefit of U.S. Provisional Application No. 62/183,845, filed on Jun. 24, 2015. The entire disclosures of the applications referenced above are incorporated herein by reference.

This application is related to U.S. patent application Ser. No. 15/164,391, filed May 25, 2016.

FIELD

The present disclosure relates generally to communication systems and more particularly to systems and method for mitigating electromagnetic interference in single twisted-pair-based communication systems used in automotive and industrial environments.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

High-speed Ethernet-based communication systems designed for use in automotive and industrial environments (e.g., in vehicles and boats) differ in many respects from communication systems used in traditional consumer electronics (e.g., computers, computer networks, and home/office equipment). For example, the communication systems in automotive and industrial environments use only single twisted-pair-based Ethernet (i.e., fewer twisted-pairs than those used in traditional consumer electronics). Additionally, the communication systems in automotive and industrial environments experience different electromagnetic interference (EMI) than the interference experienced by the communication systems in traditional consumer electronics. For example, the communication systems in automotive and industrial environments can experience EMI from sources such as radars (e.g., from police vehicles, and airport control towers), lightning, power transmission and distribution lines, engine operation, which is not normally experienced by the communication systems used in traditional consumer electronics. The communication systems in automotive and industrial environments have tighter electromagnetic compatibility (EMC) requirements as compared to the communication systems in traditional consumer electronics.

SUMMARY

A transceiver to communicate in a vehicle via a single twisted-pair Ethernet cable includes a transmitter to transmit signals via the single twisted-pair Ethernet cable and a receiver to receive signals via the single twisted-pair Ethernet cable. The transceiver comprises an equalizer, a signal-to-noise ratio estimator, and a controller. The equalizer includes a notch filter and a slicer. The equalizer is configured to receive an input signal received by the transceiver via the single twisted-pair Ethernet cable. The notch filter is configured to cancel electromagnetic interference from the input signal and to output a filtered signal. The slicer is configured to slice the filtered signal. The signal-to-noise ratio estimator is configured to estimate a signal-to-noise ratio based on an output of the slicer. The controller is configured to control a rate of adapting the equalizer by controlling a rate of change of tap values of the notch filter based on the signal-to-noise ratio.

In other features, the rate of adapting the equalizer is based on the signal-to-noise ratio.

In other features, the input signal is a combination of i) a first signal received by the receiver via the single twisted-pair Ethernet cable and ii) an echo cancellation signal from the transmitter transmitting signals via the single twisted-pair Ethernet cable.

In other features, the electromagnetic interference includes i) narrowband interference and ii) burst noise.

In other features, the equalizer is a feedforward equalizer, and the notch filter is a finite impulse response filter.

In other features, the equalizer is a decision feedback equalizer, and the notch filter is an infinite impulse response filter.

In other features, a number of taps of the notch filter is based on a frequency of the electromagnetic interference to be mitigated.

In other features, the transceiver further comprises a forward error correcting decoder to decode the output of the slicer.

In still other feature, a transceiver to communicate in a vehicle via a single twisted-pair Ethernet cable includes a transmitter to transmit signals via the single twisted-pair Ethernet cable and a receiver to receive signals via the single twisted-pair Ethernet cable. The transceiver comprises an equalizer, a power estimator, and a controller. The equalizer is configured to receive an input signal received by the transceiver via the single twisted-pair Ethernet cable. The equalizer includes a notch filter configured to cancel electromagnetic interference from the input signal. The power estimator is configured to estimate a power of the notch filter based on tap values of the notch filter. The controller is configured to control a rate of adapting the equalizer by controlling a rate of change of tap values of the notch filter based on the power of the notch filter.

In other features, the rate of adapting the equalizer is based on the power of the notch filter.

In other features, the input signal is a combination of i) a first signal received by the receiver via the single twisted-pair Ethernet cable and ii) an echo cancellation signal from the transmitter transmitting signals via the single twisted-pair Ethernet cable.

In other features, the equalizer is a feedforward equalizer, and the notch filter is a finite impulse response filter.

In other features, the equalizer is a decision feedback equalizer, and the notch filter is an infinite impulse response filter.

In other features, the transceiver further comprises a slicer configured to slice an output of the notch filter, and a forward error correcting decoder configured to decode an output of the slicer.

In still other feature, a transceiver to communicate in a vehicle via a single twisted-pair Ethernet cable includes a transmitter to transmit signals via the single twisted-pair Ethernet cable and a receiver to receive signals via the single twisted-pair Ethernet cable. The transceiver comprises an analog front end, an equalizer, and a controller. The analog front end is configured to receive a first signal received by the transceiver via the single twisted-pair Ethernet cable and to output a second signal. The equalizer includes a notch filter to cancel electromagnetic interference from the second signal. The controller is configured to make a frequency response of the equalizer independent of the electromagnetic interference by controlling tap values of the notch filter and to control gain of one or more of the analog front end and the equalizer based on the frequency response of the equalizer.

In other features, the controller is further configured to adjust the tap values of the notch filter between initial values and limit values.

In other features, the controller is further configured to minimize the gain of the one or more of the analog front end and the equalizer by maintaining the frequency response of the equalizer independent of the electromagnetic interference and by changing the tap values of the notch filter between initial values and limit values.

In other features, the first signal is received by the receiver via the single twisted-pair Ethernet cable, and the equalizer receives an echo cancellation signal from the transmitter transmitting signals via the single twisted-pair Ethernet cable.

In other features, the equalizer is a feedforward equalizer, and the notch filter is a finite impulse response filter.

In other features, the transceiver further comprises a decision feedback equalizer, a slicer, and a forward error correcting decoder. The decision feedback equalizer is configured to receive an output of the feedforward equalizer. The decision feedback equalizer includes an infinite impulse response filter. The slicer is configured to slice an output of the infinite impulse response filter. The forward error correcting decoder is configured to decode an output of the slicer.

In still other features, a method for communicating in a vehicle using a transceiver to transmit and receive signals via a single twisted-pair Ethernet cable comprises receiving, at an equalizer, an input signal received by the transceiver via the single twisted-pair Ethernet cable. The method further comprises filtering, using a notch filter, the input signal to cancel electromagnetic interference from the input signal. The method further comprises slicing the filtered signal using a slicer. The method further comprises estimating a signal-to-noise ratio based on an output of the slicer. The method further comprises controlling a rate of adapting the equalizer by controlling a rate of change of tap values of the notch filter based on the signal-to-noise ratio.

In other features, the method further comprises controlling the rate of adapting the equalizer based on the signal-to-noise ratio.

In other features, the input signal is a combination of i) a first signal received by a receiver of the transceiver via the single twisted-pair Ethernet cable and ii) an echo cancellation signal from a transmitter of the transceiver transmitting signals via the single twisted-pair Ethernet cable.

In other features, the electromagnetic interference includes i) narrowband interference and ii) burst noise.

In other features, the equalizer is a feedforward equalizer, and the notch filter is a finite impulse response filter.

In other features, the equalizer is a decision feedback equalizer, and the notch filter is an infinite impulse response filter.

In other features, the method further comprises selecting a number of taps of the notch filter based on a frequency of the electromagnetic interference to be mitigated.

In other features, the method further comprises decoding the output of the slicer using a forward error correcting decoder.

In still other features, a method for communicating in a vehicle using a transceiver to transmit and receive signals via a single twisted-pair Ethernet cable comprises receiving, at an equalizer, an input signal received by the transceiver via the single twisted-pair Ethernet cable. The method further comprises filtering, using a notch filter, the input signal to cancel electromagnetic interference from the input signal. The method further comprises estimating a power of the notch filter based on tap values of the notch filter. The method further comprises controlling a rate of adapting the equalizer by controlling a rate of change of tap values of the notch filter based on the power of the notch filter.

In other features, the method further comprises the rate of adapting the equalizer based on the power of the notch filter.

In other features, the input signal is a combination of i) a first signal received by a receiver of the transceiver via the single twisted-pair Ethernet cable and ii) an echo cancellation signal from a transmitter of the transceiver transmitting signals via the single twisted-pair Ethernet cable.

In other features, the equalizer is a feedforward equalizer, and the notch filter is a finite impulse response filter.

In other features, the equalizer is a decision feedback equalizer, and the notch filter is an infinite impulse response filter.

In other features, the method further comprises slicing the filtered signal using a slicer, and decoding an output of the slicer using a forward error correcting decoder.

In still other features, a method for communicating in a vehicle using a transceiver to transmit and receive signals via a single twisted-pair Ethernet cable comprises receiving, at an analog front end, a first signal received by the transceiver via the single twisted-pair Ethernet cable. The method further comprises cancelling, using an equalizer, electromagnetic interference from a second signal output from the analog front end. The method further comprises making a frequency response of the equalizer independent of the electromagnetic interference by controlling tap values of a notch filter of the equalizer. The method further comprises controlling gain of one or more of the analog front end and the equalizer based on the frequency response of the equalizer.

In other features, the method further comprises adjusting the tap values of the notch filter between initial values and limit values.

In other features, the method further comprises minimizing the gain of the one or more of the analog front end and the equalizer by maintaining the frequency response of the equalizer independent of the electromagnetic interference and by changing the tap values of the notch filter between initial values and limit values.

In other features, the method further comprises receiving the first signal at a receiver of the transceiver via the single twisted-pair Ethernet cable. The method further comprises receiving an echo cancellation signal at the equalizer from a transmitter of the transceiver transmitting signals via the single twisted-pair Ethernet cable.

In other features, the equalizer is a feedforward equalizer, and the notch filter is a finite impulse response filter.

In other features, the method further comprises receiving, at a decision feedback equalizer, an output of the feedforward equalizer. The decision feedback equalizer includes an infinite impulse response filter. The method further comprises slicing an output of the infinite impulse response filter using a slicer, and decoding an output of the slicer using a forward error correcting decoder.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

FIG. 5 is a flowchart of a first method to mitigate EMI using the first, SNR-based approach according to the present disclosure.

FIG. 6 is a flowchart of a second method to mitigate EMI using the second, power-based approach according to the present disclosure.

In the drawings, reference numbers may be reused to identify similar and/or identical elements.

DESCRIPTION

The Institute of Electrical and Electronics Engineers (IEEE) draft standards 802.3 bp/D3.0 (1000BASE-T1) and 802.3bw/D3.3 (100BASE-T1) govern single twisted-pair-based communication systems designed to operate in automotive and industrial environments. The entire disclosures of these draft standards are incorporated herein by reference.

In single twisted-pair-based communication systems designed to operate in automotive and industrial environments, the symbol rate can be as high as 750M symbols/s. Achieving the symbol rate of 750M symbols/s over a single twisted-pair in noisy environments can be challenging. Accordingly, the present disclosure relates to systems and method for mitigating electromagnetic interference (EMI) in single twisted-pair-based communication systems designed to operate in automotive and industrial environments.

Specifically, the systems and methods of the present disclosure utilize equalizers, which are typically used to equalize communication channels, for a different purpose: to mitigate EMI. More specifically, the systems and methods of the present disclosure use three different approaches to adapt the equalizers to mitigate EMI. In a first approach, a rate at which the equalizers are adapted to mitigate EMI is based on signal-to-noise ratio (SNR). In a second approach, the rate at which the equalizers are adapted to mitigate EMI is based on the power of notch filters used by the equalizers. In a third approach, the frequency response of the equalizers is made independent of EMI by controlling tap values of the notch filters used by the equalizers, which allows minimizing amplification of signals, including the EMI, along a path from an analog front end of the receiver to the equalizers. These and other aspects of the systems and methods of the present disclosure are described below in detail.

Figure 1A:
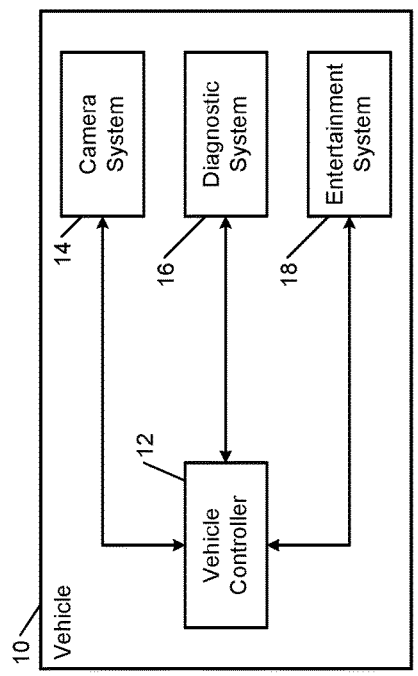
FIGS. 1A-1C show a non-limiting example of a single twisted-pair-based Ethernet communication system designed for use in a vehicle.
Figure 1C:
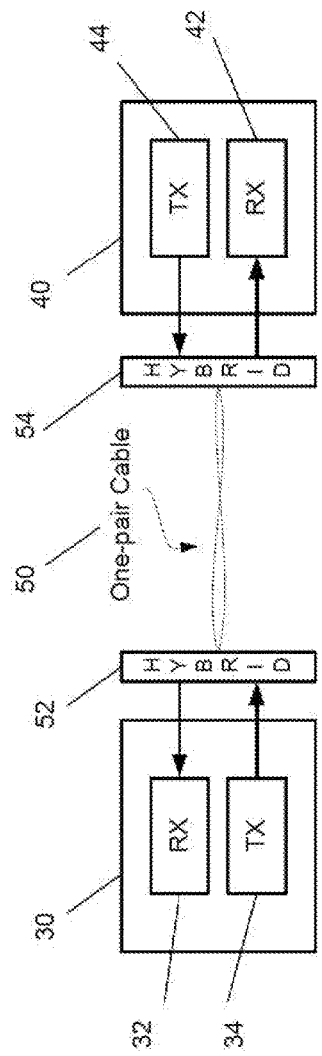
Figure 1B:
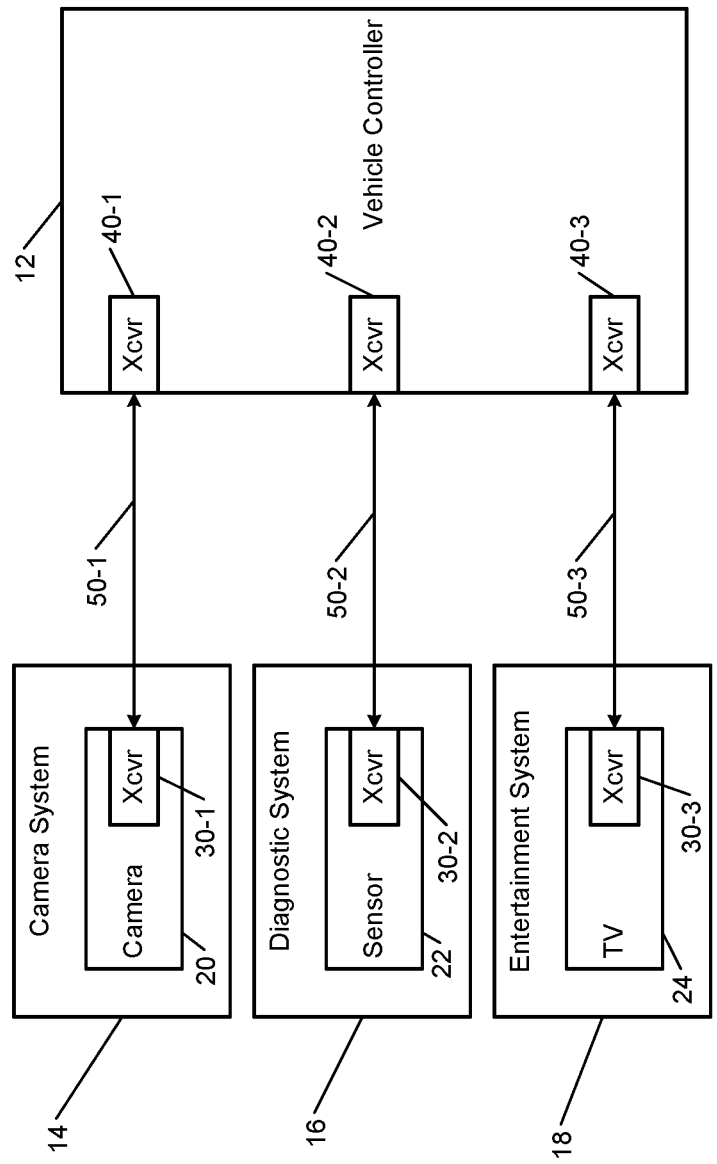

FIGS. 1A-1C show a non-limiting example of a single twisted-pair-based Ethernet communication system designed for use in a vehicle 10. For example only, the vehicle 10 can include an automobile, a boat, and so on. In FIG. 1A, the vehicle 10 includes a vehicle controller 12 that communicates with a plurality of systems including, for example, a camera system 14, a diagnostic system 16, and an entertainment system 18. While not shown, the vehicle 10 can include additional systems such as a communication system that can communicate with the device and/or a network external to the vehicle 10. The vehicle controller 12 can also control these additional systems.

The camera system 14 can include one or more cameras that are installed in the vehicle 10 to assist, for example, in backing up the vehicle 10, in parking the vehicle 10, in maintaining a desired distance between the vehicle 10 and a vehicle ahead of the vehicle 10 while driving, and/or in maintaining a lane while driving. The vehicle controller 12 can receive data from the one or more cameras of the camera system 14 and can control the operation of the vehicle 10, including providing alerts or warnings to the occupants of the vehicle 10, based on the data received from the camera system 14.

The diagnostic system 16 can include, for example, one or more sensors installed in the vehicle 10 to sense events and/or conditions associated with the vehicle 10. For example, a sensor can sense tire pressure on a flat tire, ambient temperature, temperature inside the vehicle 10, road conditions, whether the doors and/or windows are open and/or closed, seat positions, and so on. The vehicle controller 12 can receive data from one or more sensors of the diagnostic system 16 and can control the operation of the vehicle 10, including providing alerts or warnings to the occupants of the vehicle 10, based on the data received from the diagnostic system 16.

The entertainment system 18 can include, for example, one or more multimedia devices such as televisions that can be disposed at different locations in the vehicle 10. The vehicle controller 12 can control the distribution of multimedia content to the occupants of the vehicle 10 through the entertainment system 18.

In FIG. 1B, each of the devices of the plurality of systems (e.g., a camera, a sensor, a television, and so on) includes a transceiver that communicates with a corresponding transceiver the vehicle controller 12 via a single twisted-pair Ethernet cable. For example, the camera system 14 can include a camera 20 and a transceiver 30-1 that communicates with a transceiver 40-1 of the vehicle controller 12 via a single twisted-pair Ethernet cable 50-1. For example, the diagnostic system 16 can include a sensor 22 and a transceiver 30-2 that communicates with a transceiver 40-2 of the vehicle controller 12 via a single twisted-pair Ethernet cable 50-2. For example, the entertainment system 18 can include a television 24 and a transceiver 30-3 that communicates with a transceiver 40-3 of the vehicle controller 12 via a single twisted-pair Ethernet cable 50-3.

In FIG. 1C, a transceiver 30 (e.g., transceiver 30-1, 30-2, 30-3) of a device (e.g., a camera, a sensor, a television) of the plurality of systems (e.g., systems 14, 16, 18) communicates with a transceiver 40 (e.g., transceiver 40-1, 40-2, 40-3) of the vehicle controller 12 via a single twisted-pair Ethernet cable 50 (e.g., 50-1, 50-2, 50-3). For example, the transceiver 30 includes a transmitter 32 and a receiver 34, and the transceiver 40 includes a transmitter 42 and a receiver 44. The single twisted-pair Ethernet cable 50 connects to the transceiver 30 via a first hybrid 52 and to the transceiver 40 via a second hybrid 54 as shown.

The transmitter 32 of the transceiver 30 of a device (e.g., a camera, a sensor, a television) of the plurality of systems (e.g., systems 14, 16, 18) transmits signals via the first hybrid 52 and the single twisted-pair Ethernet cable 50 to the transceiver 40 of the vehicle controller 12. The receiver 44 of the transceiver 40 of the vehicle controller 12 receives the signals transmitted by the transmitter 32 of the transceiver 30 of the device via the single twisted-pair Ethernet cable 50 and the second hybrid 54.

The transmitter 42 of the transceiver 40 of the vehicle controller 12 transmits signals via the second hybrid 54 and the single twisted-pair Ethernet cable 50 to the transceiver 30 of the device (e.g., a camera, a sensor, a television) of the plurality of systems (e.g., systems 14, 16, 18). The receiver 34 of the transceiver 30 of the device receives the signals transmitted by the transmitter 42 of the transceiver 40 of the vehicle controller 12 via the single twisted-pair Ethernet cable 50 and the first hybrid 52.

Figure 2:
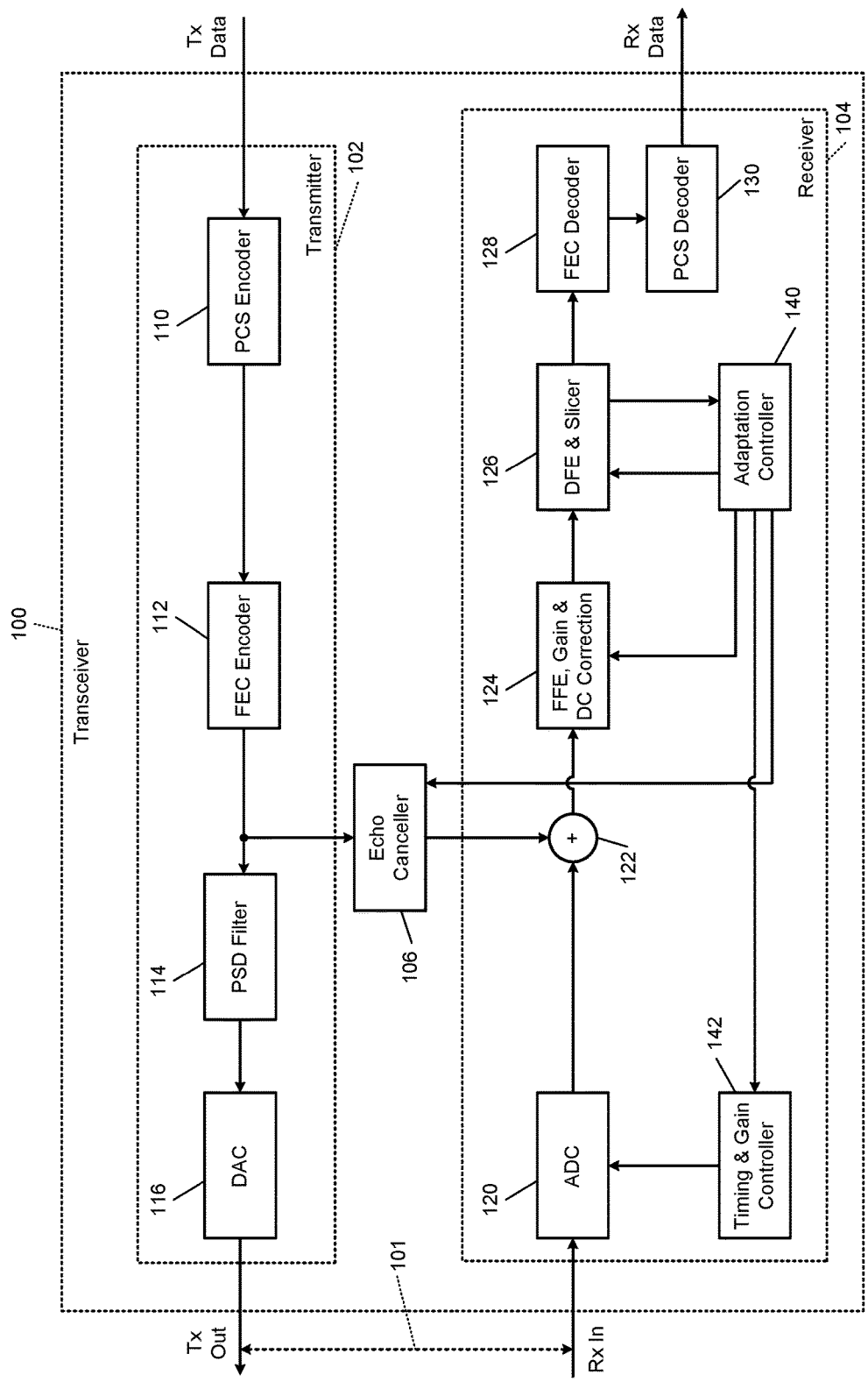
FIG. 2 is a functional block diagram of a digital signal processing (DSP) system of a transceiver designed for use in a single twisted-pair-based Ethernet communication system in automotive and industrial environments according to the present disclosure.

FIG. 2 shows a digital signal processing (DSP) system of a transceiver 100 designed for use in a single twisted-pair-based Ethernet communication system in automotive and industrial environments according to the present disclosure. The transceiver 100 supports a symbol rate of 750M symbols/s over a single twisted-pair and mitigates EMI (including narrowband interference (NBI) and burst noise). The transceiver 100 supports the IEEE 802.3 bp/D3.0 (1000BASE-T1) and 802.3bw/D3.3 (100BASE-T1) standards. The transceiver 100 shares the IEEE physical coding sublayer (PCS) command set for 1000 MBps and 100 MBps modes. The transceiver 100 uses 3-level pulse amplitude modulation (PAM3) signaling.

The transceiver 100 includes a transmitter 102, a receiver 104, and an echo canceller 106. The transmitter 102 transmits data via a first hybrid (not shown) and a single twisted-pair cable 101. The receiver 104 receives data via a second hybrid (not shown) and the single twisted-pair cable 101.

The transceiver 100 is similar to the transceivers 30 and 40 shown in FIG. 1C. The transmitter 102 is similar to the transmitters 32 and 42 shown in FIG. 1C. The receiver 104 is similar to the receivers 34 and 44 shown in FIG. 1C. The single twisted-pair cable 101 is similar to the single twisted-pair Ethernet cable 50 shown in FIG. 1C. The first and second hybrids are similar to the first and second hybrids 42 and 54 shown in FIG. 1C.

The transmitter 102 includes a PCS encoder 110, a forward error correction (FEC) encoder 112, a power spectral density (PSD) filter 114, and a digital-to-analog converter (DAC) 116. The PCS encoder 110 encodes data to be transmitted. The FEC encoder 112 encodes the output of the PCS encoder 110 using codes such as Reed-Solomon codes with or without configurable erasure to handle EMI as well as EMI cancellation. The PSD filter 114 performs shaping and emission control based on the output of the FEC encoder 112. The DAC 116 converts the output of the PSD filter 114 into analog signals that are transmitted via the single twisted-pair cable 101.

The echo canceller 106 receives the output of the FEC encoder 112 and generates an echo cancellation signal. The echo cancellation signal is used by the receiver 104 to cancel any echo that may be present in the signals received by the receiver 104 via the single twisted-pair cable 101 due to the signals transmitted by the transmitter 102 via the single twisted-pair cable 101.

The receiver 104 includes an analog-to-digital converter (ADC) 120, a combiner 122, a feed-forward equalizer (FFE) 124, a decision feedback equalizer (DFE) 126, a FEC decoder 128, a PCS decoder 130, an adaptation controller 140, and a timing and gain controller 142. The FFE 124 also includes a gain adjuster, a DC offset correction block, and a baseline wandering (BLW) correction block. The DFE 126 also includes a slicer.

The ADC 120 receives signals from the single twisted-pair cable 101 and converts the signals from analog to digital format. The timing and gain controller 142 controls the sampling phase of the ADC 120 based on the error in the data output by the slicer in the DFE 126. The timing and gain controller 142 also controls the timing and gain of the ADC 120 under the control of the adaptation controller 140. The combiner 122 combines the output of the ADC 120 and the output of the echo canceller 106 and outputs an echo cancelled signal.

The FFE 124 receives the output of the combiner 122. The FFE 124 mitigates EMI from the signal received from the combiner 122 as explained below. The FFE 124 also includes a gain adjuster that adjusts the gain of the signal received from the combiner 122. The FFE 124 also includes an offset correction block (not shown) that corrects DC offset in the signal received from the combiner 122. The receiver 104 (e.g., the FFE 124) also includes a baseline wandering (BLW) correction block (not shown) that performs baseline wandering correction on the signal received from the combiner 122.

The DFE 126 receives the output of the FFE 124 and further mitigates EMI as explained below. The DFE 126 also includes a slicer that slices the signal received from the FFE 124 and processed by the DFE 126. A slicer or clipper is a device designed to prevent an output of a circuit from exceeding a predetermined voltage level without distorting the remainder of the waveform. A slicer is used to select a part of a signal waveform that lies above or below a predetermined reference voltage level. Thus a slicer can remove some portions of a waveform near the positive or negative peaks. The slicer outputs bits of data that represent the data received by the receiver 104 via the single twisted-pair cable 101. The FEC decoder 128 decodes the data output by the slicer using codes such as Reed-Solomon codes. The PCS decoder 130 decodes the output of the FEC decoder 128 and outputs data received by the receiver 104 that is free of EMI at 750M symbols/s.

The adaptation controller 140 controls various aspects (e.g., parameters including gain, timing, coefficients, and tap values) of the FFE 124, DFE 126, echo canceller 106, and ADC 120 to mitigate EMI as follows. The FFE 124 and the DFE 126 generate notch filters to filter EMI. The FFE 124 uses a finite impulse response (FIR) filter as notch filter. The DFE 126 uses an infinite impulse response (IIR) filter as notch filter. The adaptation controller 140 controls the rate at which one or both of the FFE 124 and the DFE 126 generate the respective notch filters. The adaptation controller 140 also controls the tap values of one or both of the notch filters. The number of taps of the notch filters is determined by the interference frequency to be mitigated.

The receiver 104 uses leaky FFE 124 and leaky DFE 126 to improve convergence (i.e., minimization of error) and stability of the FFE 124 and DFE 126. Leakage of an equalizer means rate of adaptation of the equalizer (e.g., rate of generation of a notch filter of the equalizer, and/or rate of change of tap values of the notch filter). Leakage control is performed by the adaptation controller 140 for one or both of the FFE 124 and DFE 126.

Figure 3:
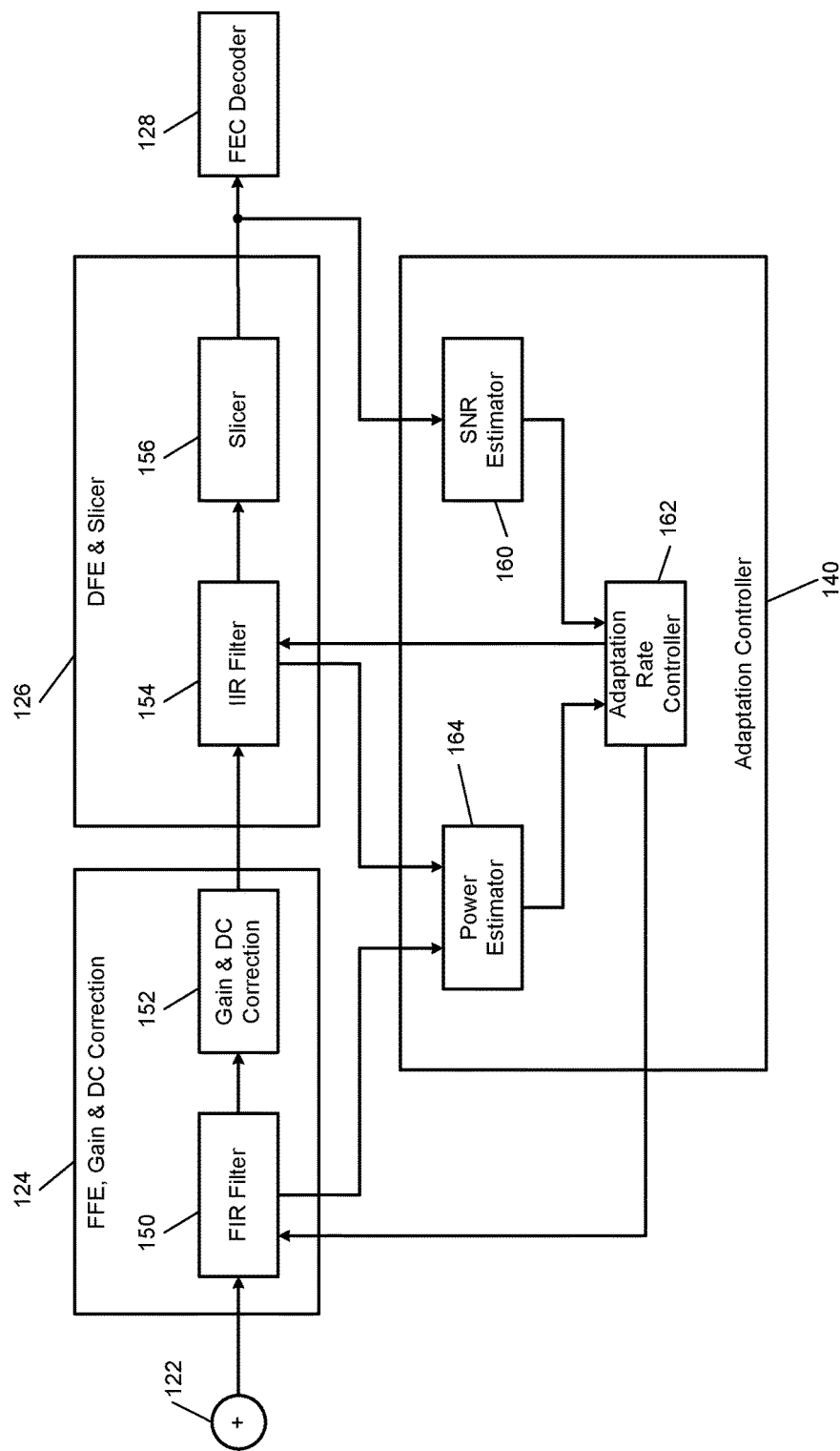
FIG. 3 shows an example of equalizers and an adaptation controller of the transceiver of FIG. 2, where the adaptation controller uses a first, SNR-based approach; and a second, power-based approach to mitigate electromagnetic interference (EMI).

FIG. 3 shows an example of the FFE 124, the DFE 126, and the adaptation controller 140 that can implement the first approach or the second approach to mitigate EMI in one embodiment. The FFE 124 includes an FIR filter 150 and a gain and DC correction block 152. The DFE 126 includes an IIR filter 154 and a slicer 156. The adaptation controller 140 includes an SNR estimator 160, an adaptation rate controller 162, and a power estimator 164.

The FIR filter 150 receives an input signal from the combiner 122. The input signal is a combination of a first signal received by the receiver 104 via the single twisted-pair cable 101 and an echo cancellation signal from the transmitter 102 transmitting signals via the single twisted-pair cable 101. The FIR filter 150 outputs a filtered signal to the gain and DC correction block 152. The gain and DC correction block 152 adjusts the gain and corrects a DC offset in the filtered signal. While not shown, a BLW correction block performs baseline wandering correction on the signal received from the combiner 122. The IIR filter 154 further filters the signal received from the FFE 124. The slicer 156 slices the output of the IIR filter 154 and outputs bits of digital data to the FEC decoder 128.

While the adaptation controller 140 is shown to include both the SNR estimator 160 and the power estimator 164, the adaptation controller 140 includes the SNR estimator 160 alone in a first implementation using the first approach to mitigate EMI described above and the power estimator 164 alone in a second implementation using the second approach to mitigate EMI described above. In the first implementation using the first approach to mitigate EMI, the SNR estimator estimates SNR at an output of the equalizer (e.g., the DFE 126), and the adaptation controller 140 controls a rate at which the equalizers are adapted to mitigate EMI based on the SNR. In the second implementation using the second approach to mitigate EMI, the power estimator 164 estimates the power of the notch filters used by the equalizers, and the adaptation controller 140 controls a rate at which the equalizers are adapted to mitigate EMI based on the power of notch filters used by the equalizers.

In the first implementation, an equalizer including the FFE 124 and the DFE 126 receives an input signal and cancels EMI from the input signal. The EMI includes narrowband interference and burst noise. The input signal includes outputs of the analog front end of the receiver 104 (e.g., the ADC 120) and of the echo canceller 106. The echo canceller 106 cancels echo in the signal received by the receiver 104 due to a signal transmitted from the transmitter 102 collocated with the receiver 104.

The equalizer includes a notch filter to cancel the EMI from the input signal and to output a filtered signal. Specifically, the FFE 124 includes the FIR filter 150 as a first notch filter, and the DFE 126 includes the IIR filter 154 as a second notch filter. The equalizer includes a slicer to slice the filtered signal. Specifically, the DFE 126 includes the slicer 156 to slice the output of the IIR filter 154.

The SNR estimator 160 estimates the SNR based on an output of the equalizer (i.e., the output of the slicer 156). The adaptation rate controller 162 controls a rate of adapting one or both of the equalizers (the FFE 124 and the DFE 126) by controlling a rate of change of tap values of the respective notch filters (the FIR filter 150 and the IIR filter 154) based on the SNR to mitigate EMI. The rate of adapting the one or both of the equalizers (the FFE 124 and the DFE 126) is proportional to the SNR. For example, the rate of adapting the one or both of the equalizers (the FFE 124 and the DFE 126) is directly proportional to the SNR.

The adaptation controller 140 can adapt the one or both of the equalizers (the FFE 124 and the DFE 126) by utilizing a lookup table that provides values for the leakage factor (i.e., the rate of adaptation) of the one or both of the equalizers (the FFE 124 and the DFE 126) corresponding to the SNR. When the SNR is high, the leakage factor is high; and when the SNR is low, the leakage factor is low. For example, when the SNR falls due to EMI, the low leakage factor means that the one or both of the equalizers (the FFE 124 and the DFE 126) are adapted gradually (slowly) rather than drastically (fast) to mitigate EMI. After the SNR becomes high (i.e., when EMI is mitigated), the high leakage factor means that the one or both of the equalizers (the FFE 124 and the DFE 126) are quickly adapted to a noise-free operation state.

In the second implementation, an equalizer including the FFE 124 and the DFE 126 receives an input signal and cancels EMI from the input signal. The EMI includes narrowband interference and burst noise. The input signal includes outputs of the analog front end of the receiver 104 (e.g., the ADC 120) and of the echo canceller 106. The echo canceller 106 cancels echo in the signal received by the receiver 104 due to a signal transmitted from the transmitter 102 collocated with the receiver 104.

The equalizer includes a notch filter to cancel the EMI from the input signal and to output a filtered signal. Specifically, the FFE 124 includes the FIR filter 150 as a first notch filter, and the DFE 126 includes the IIR filter 154 as a second notch filter. The equalizer includes a slicer to slice the filtered signal. Specifically, the DFE 126 includes the slicer 156 to slice the output of the IIR filter 154.

The power estimator 164 estimates the power of one or more of the first and second notch filters of the FFE 124 and the DFE 126 based on tap values of the respective notch filters. When the tap values of a notch filter of an equalizer are all zero, the power of the notch filter of the equalizer is zero, which means the equalizer does not generate the notch filter. When the tap values of the notch filter of the equalizer are larger, the power of the notch filter of the equalizer is high. When the power of the notch filter of the equalizer is high, the leakage factor (i.e., the rate of adaptation) of the equalizer is higher. The adaptation controller 140 can adapt the equalizer by utilizing a lookup table that provides values for the leakage factor (i.e., the rate of adaptation) of the equalizer corresponding to the power of the notch filter of the equalizer.

The adaptation rate controller 162 controls a rate of adapting one or both of the equalizers (the FFE 124 and the DFE 126) by controlling a rate of change of tap values of the respective notch filters based on the power of the respective notch filters to mitigate EMI. The rate of adapting the one or both of the equalizers is proportional to the power of the respective notch filters. For example, the rate of adapting the one or both of the equalizers (the FFE 124 and the DFE 126) is directly proportional to the power of the respective notch filters.

Figure 4:
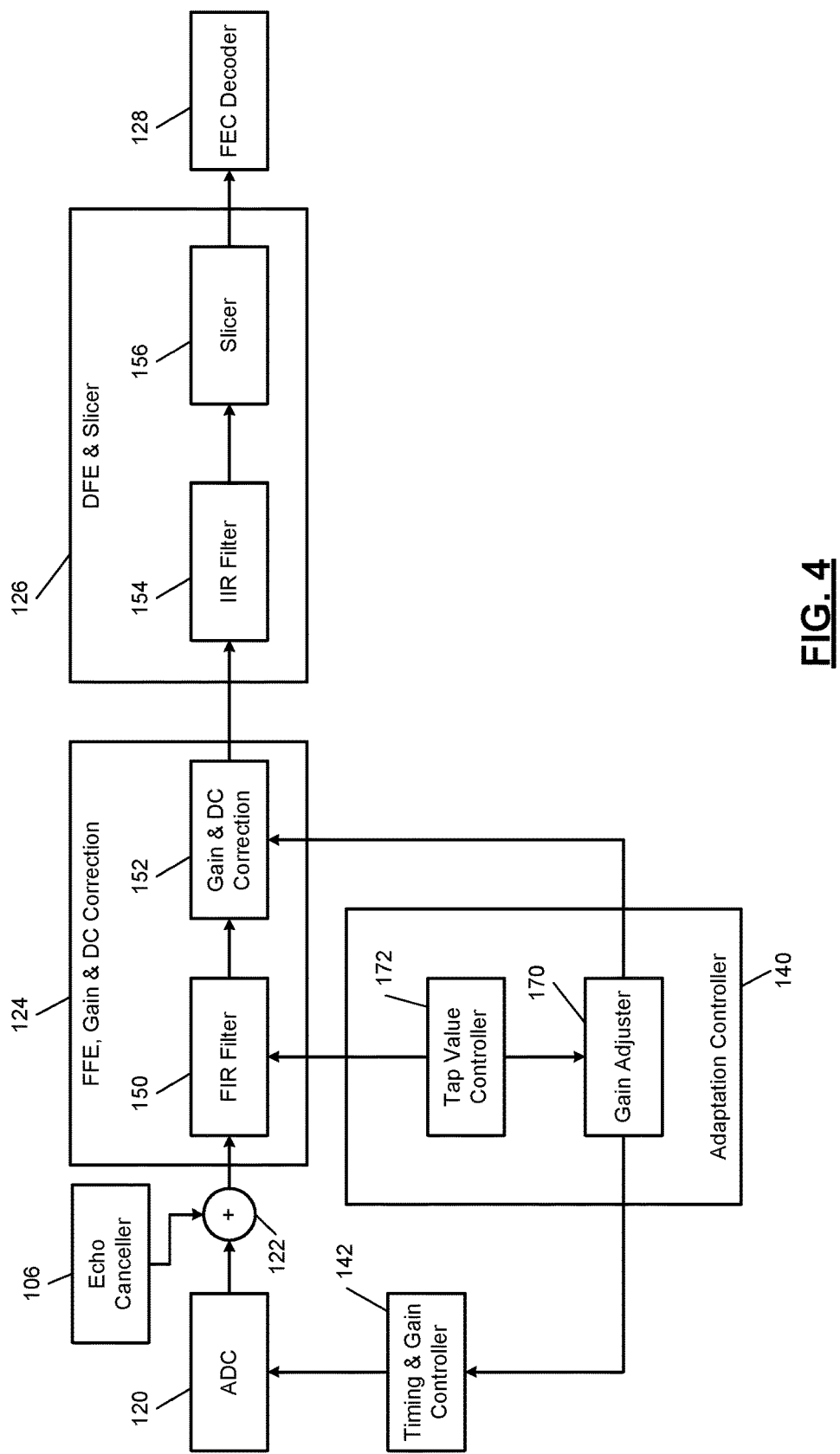
FIG. 4 shows an example of equalizers and an adaptation controller of the transceiver of FIG. 2, where the adaptation controller uses a third, frequency-response-based approach to mitigate EMI.

FIG. 4 shows an example of the FFE 124, the DFE 126, and the adaptation controller 140 that can implement the third approach to mitigate EMI in one embodiment. The FFE 124 includes an FIR filter 150 and a gain and DC correction block 152 (a BLW correction block is omitted). The DFE 126 includes an IIR filter 154 and a slicer 156. The adaptation controller 140 includes a gain adjuster 170 and a tap value controller 172.

The FIR filter 150 receives an input signal from the combiner 122. The input signal is a combination of a first signal received by the receiver 104 via the single twisted-pair cable 101 and an echo cancellation signal from the transmitter 102 transmitting signals via the single twisted-pair cable 101. The FIR filter 150 outputs a filtered signal to the gain and DC correction block 152. The gain and DC correction block 152 adjusts the gain and corrects a DC offset in the filtered signal. While not shown, a BLW correction block performs baseline wandering correction on the signal received from the combiner 122. The IIR filter 154 further filters the signal received from the FFE 124. The slicer 156 slices the output of the IIR filter 154 and outputs bits of digital data to the FEC decoder 128.

In some implementations, the adaptation controller 140 can include all the components (i.e., elements 160, 162, 164, 170, and 172) shown in FIGS. 3 and 4 to support all three approaches to mitigate EMI, and the adaptation controller 140 can select one or more of the three approaches to mitigate EMI based on the channel conditions. According to the third approach to mitigate EMI, a frequency response of the equalizer (e.g., the FFE 124) is made independent of EMI by controlling tap values of the notch filter (e.g., the FIR filter 150) used by the equalizer (e.g., the FFE 124). This allows minimizing amplification of signals, including the EMI, along a path from the analog front end of the receiver 104 (e.g., from the ADC 120) to the equalizers (e.g., the FFE 124 and/or the DFE 126).

To improve the NBI performance, the signal amplification from the front end path (from the analog front end to the slicer) of the receiver 104 should be minimized. In order to achieve this goal, the shape of the frequency response of the equalizer (e.g., the FFE 124) should be under control. The shape of the frequency response of the equalizer (e.g., the FFE 124) is controlled by using predefined initial tap values and bounded or limited tap values for the notch filter (e.g., the FIR filter 150) used by the equalizer (e.g., the FFE 124).

The adaptation controller 140 makes a frequency response of the equalizer (e.g., the FFE 124) independent of the EMI by controlling tap values of the notch filter (e.g., the FIR filter 150) to control gain of one or more of the analog front end of the receiver 104 (e.g., the ADC 120) and the equalizer (e.g., the FFE 124) based on the frequency response of the equalizer (e.g., the FFE 124). The tap value controller 172 adjusts the tap values of the notch filter (e.g., the FIR filter 150) between predetermined initial values and limit values. The gain adjuster 170 minimizes the gain of the one or more of the analog front end of the receiver 104 (e.g., the ADC 120) and the equalizer (e.g., the FFE 124) by maintaining the frequency response of the equalizer (e.g., the FFE 124) independent of the EMI and by changing the tap values of the notch filter (e.g., the FIR filter 150) between initial values and limit values.

FIG. 5 shows a method 200 to mitigate EMI using the first approach according to one embodiment. For example, the method 200 can be performed by the transceiver 100 shown in FIG. 2. At 202, control (e.g., the FFE 124 and the DFE 126 shown in FIGS. 2 and 3) receives an input from an analog front end of a receiver and an echo canceller. At 204, control processes the input using an equalizer to cancel EMI in the input. At 206, control (e.g., the adaptation controller 140 and the SNR estimator 160 shown in FIGS. 2 and 3) estimates SNR at an output of the equalizer. At 208, control adjusts a rate of adaptation of the equalizer by controlling a rate of change of tap values of a notch filter of the equalizer according to the SNR.

FIG. 6 shows a method 300 to mitigate EMI using the second approach according to an embodiment. For example, the method 200 can be performed by the transceiver 100 shown in FIG. 2. At 302, control (e.g., the FFE 124 and the DFE 126 shown in FIGS. 2 and 3) receives an input from an analog front end of a receiver and an echo canceller. At 304, control processes the input using an equalizer to cancel EMI in the input. At 306, control (e.g., the adaptation controller 140 and the power estimator 164 shown in FIGS. 2 and 3) estimates power of a notch filter of the equalizer based on tap values of the notch filter. At 308, control adjusts the notch filter of the equalizer by controlling a rate of leakage of tap values of the notch filter of the equalizer according to the power of the notch filter.

Figure 7:
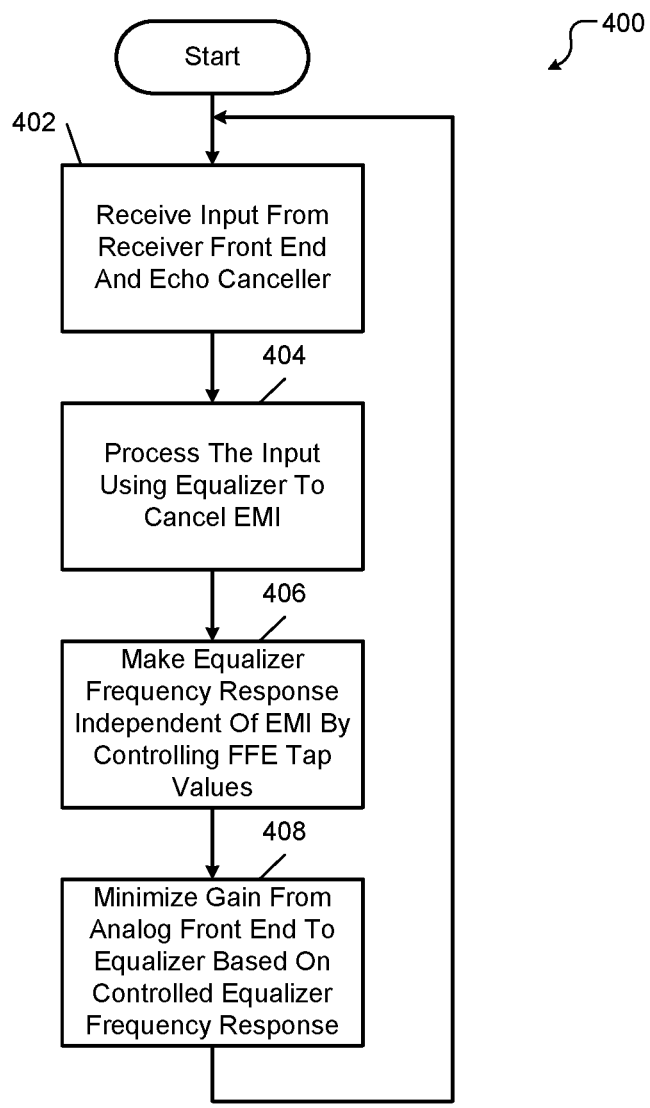
FIG. 7 is a flowchart of a third method to mitigate EMI using the third, frequency-response-based approach according to the present disclosure.

FIG. 7 shows a method 400 to mitigate EMI using the third approach according to an embodiment. For example, the method 200 can be performed by the transceiver 100 shown in FIG. 2. At 402, control (e.g., the FFE 124 and the DFE 126 shown in FIGS. 2 and 4) receives an input from an analog front end of a receiver and an echo canceller. At 404, control processes the input using an equalizer to cancel EMI in the input. At 406, control (e.g., the tap value controller shown in FIG. 4) makes a frequency response of the equalizer independent of EMI by controlling tap values of a notch filter used by the equalizer between predetermined initial values (first set of tap values) and limit values (second set of tap values). At 408, control (e.g., the gain adjuster 170 shown in FIG. 4) minimizes the gain from the analog front end to the equalizer based on the controlled frequency response of the equalizer.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

In this application, apparatus elements described as having particular attributes or performing particular operations are specifically configured to have those particular attributes and perform those particular operations. Specifically, a description of an element to perform an action means that the element is configured to perform the action. The configuration of an element may include programming of the element, such as by encoding instructions on a non-transitory, tangible computer-readable medium associated with the element.

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A transceiver to communicate in a vehicle via a single twisted-pair Ethernet cable, the transceiver including a transmitter to transmit signals via the single twisted-pair Ethernet cable and a receiver to receive signals via the single twisted-pair Ethernet cable, the transceiver comprising:
   an analog front end to receive a first signal received by the transceiver via the single twisted-pair Ethernet cable and to output a second signal;
   an equalizer including a notch filter to cancel electromagnetic interference from the second signal; and
   a controller to make a frequency response of the equalizer independent of the electromagnetic interference by controlling tap values of the notch filter and to control gain of one or more of the analog front end and the equalizer based on the frequency response of the equalizer.

2. The transceiver of claim 1, wherein the controller is further to adjust the tap values of the notch filter between initial values and limit values.

3. The transceiver of claim 1, wherein the controller is further to minimize the gain of the one or more of the analog front end and the equalizer by maintaining the frequency response of the equalizer independent of the electromagnetic interference and by changing the tap values of the notch filter between initial values and limit values.

4. The transceiver of claim 1, wherein the first signal is received by the receiver via the single twisted-pair Ethernet cable, and wherein the equalizer receives an echo cancellation signal from the transmitter transmitting signals via the single twisted-pair Ethernet cable.

5. The transceiver of claim 1, wherein the equalizer is a feedforward equalizer, and wherein the notch filter is a finite impulse response filter.

6. The transceiver of claim 5, further comprising:
a decision feedback equalizer to receive an output of the feedforward equalizer, the decision feedback equalizer including an infinite impulse response filter;
a slicer to slice an output of the infinite impulse response filter; and
a forward error correcting decoder to decode an output of the slicer.

7. The transceiver of claim 1, wherein the electromagnetic interference includes i) narrowband interference and ii) burst noise.

8. The transceiver of claim 1, wherein a number of taps of the notch filter is based on a frequency of the electromagnetic interference to be mitigated.

9. The transceiver of claim 1, further comprising:
a slicer to slice an output of the notch filter; and
a forward error correcting decoder to decode an output of the slicer.

10. A method for communicating in a vehicle using a transceiver to transmit and receive signals via a single twisted-pair Ethernet cable, the method comprising:
receiving, at an analog front end, a first signal received by the transceiver via the single twisted-pair Ethernet cable;
cancelling, using an equalizer, electromagnetic interference from a second signal output from the analog front end;
making a frequency response of the equalizer independent of the electromagnetic interference by controlling tap values of a notch filter of the equalizer; and
controlling gain of one or more of the analog front end and the equalizer based on the frequency response of the equalizer.

11. The method of claim 10, further comprising adjusting the tap values of the notch filter between initial values and limit values.

12. The method of claim 10, further comprising minimizing the gain of the one or more of the analog front end and the equalizer by maintaining the frequency response of the equalizer independent of the electromagnetic interference and by changing the tap values of the notch filter between initial values and limit values.

13. The method of claim 10, further comprising:
receiving the first signal at a receiver of the transceiver via the single twisted-pair Ethernet cable; and
receiving an echo cancellation signal at the equalizer from a transmitter of the transceiver transmitting signals via the single twisted-pair Ethernet cable.

14. The method of claim 10, wherein the equalizer is a feedforward equalizer, and wherein the notch filter is a finite impulse response filter.

15. The method of claim 14, further comprising:
receiving, at a decision feedback equalizer, an output of the feedforward equalizer, the decision feedback equalizer including an infinite impulse response filter;
slicing an output of the infinite impulse response filter using a slicer; and
decoding an output of the slicer using a forward error correcting decoder.

16. The method of claim 10, wherein the electromagnetic interference includes i) narrowband interference and ii) burst noise.

17. The method of claim 10, further comprising selecting a number of taps of the notch filter is based on a frequency of the electromagnetic interference to be mitigated.

18. The method of claim 10, further comprising:
slicing an output of the notch filter using a slicer; and
decoding an output of the slicer using a forward error correcting decoder.

* * * * *